United States Patent
Kopec et al.

(10) Patent No.: US 6,523,237 B1
(45) Date of Patent: Feb. 25, 2003

(54) AUTOMOTIVE SEAT ASSEMBLY HAVING AN INTEGRAL TEAR SEAM

(75) Inventors: Gary Kopec, Sterling Heights, MI (US); Sean Persha, Farmington, MI (US); Scott Fileccia, New Hudson, MI (US); Manoj Srivastava, Rochester Hills, MI (US); Philip W. Hadley, West Bloomfield, MI (US)

(73) Assignee: Magna Interior Systems Inc., Aurora (CA)

(*) Notice: Subject to any disclaimer, the term of this patent is extended or adjusted under 35 U.S.C. 154(b) by 0 days.

(21) Appl. No.: 09/700,964

(22) PCT Filed: May 21, 1999

(86) PCT No.: PCT/CA99/00425

§ 371 (c)(1),
(2), (4) Date: Nov. 21, 2000

(87) PCT Pub. No.: WO99/61222

PCT Pub. Date: Dec. 2, 1999

Related U.S. Application Data

(60) Provisional application No. 60/086,204, filed on May 21, 1998.

(51) Int. Cl.[7] .............................. B68G 7/00; B60R 21/00
(52) U.S. Cl. ..................................... 29/91.1; 297/216.13
(58) Field of Search ........................ 297/216.13, 216.1, 297/216.14; 280/730.2, 728.3; 29/91.1, 91, 432, 432.1, 447, 33 R, 650; 156/73.1, 580.1, 580.2; 264/118, 119

(56) References Cited

U.S. PATENT DOCUMENTS

| | | | | |
|---|---|---|---|---|
| 4,770,730 A | * | 9/1988 | Abe |
| 5,651,582 A | * | 7/1997 | Nakano |
| 5,893,579 A | * | 4/1999 | Kimura et al. |
| 5,967,603 A | * | 10/1999 | Genders et al. |
| 6,003,938 A | * | 12/1999 | Lachat et al. |
| 6,045,151 A | * | 4/2000 | Wu |

* cited by examiner

Primary Examiner—Milton Nelson, Jr.
(74) Attorney, Agent, or Firm—Clark Hill PLC

(57) ABSTRACT

An automotive seat assembly is provided with an integrated side impact airbag. The seat assembly comprises a seat cushion and a seat back mounted to the seat cushion. A seat cushion trim cover material covers the seat cushion and a seat back trim a cover material covers the seat back. The seat assembly is characterized by a tear seam integrally formed within a bolster section of the seat back trim cover material. The tear seam defines a frangible line of weakness within the trim cover material wherein the airbag will tear through the tear seam when the airbag is deployed and inflated to a position outside of the seat assembly. The subject invention also includes a manufacturing apparatus for forming the tear seam in the trim cover material. The apparatus comprises a template (48) supporting the trim cover material (28). A C-shaped raised ridge (50) extends upwardly from the template to abut the inside surface of the trim cover material (28). A welder (52) is disposed adjacent the outside surface of the trim cover material (28) such that the trim cover material is wedged between the template (48) and the welder (52). The welder is aligned with the raised ridge to form the tear seam within the trim cover material.

5 Claims, 4 Drawing Sheets

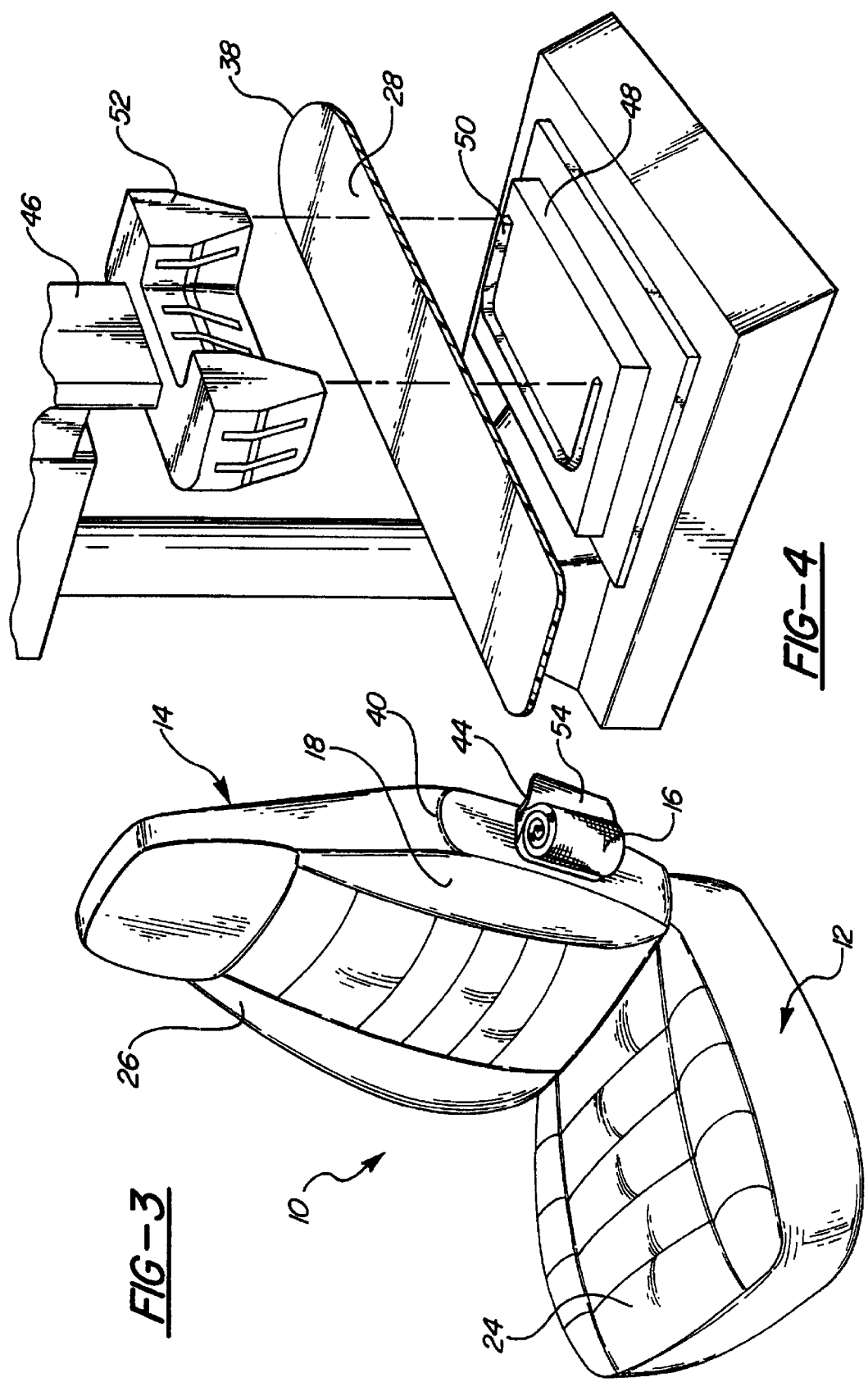

AUTOMOTIVE SEAT ASSEMBLY HAVING AN INTEGRAL TEAR SEAM

This application claims the benefit of Provisional Application No. 60/086,204, filed 05/21/98.

TECHNICAL FIELD OF THE INVENTION

The subject invention relates to automotive seat assemblies having integral airbags. More precisely, the subject invention relates to the specific characteristics of the seat assembly which ensure a complete and full deployment of the airbag.

BACKGROUND OF THE INVENTION

Government and automobile industry researches are continuously looking at ways to make can safer. Airbags are frequently installed within the dash board, armrest, and steering wheel of many vehicles to enhance the safety of the vehicle. European Patent No. 0 749 872 illustrates one such example of an airbag in a dash board and European Patent No. 0 733 518 illustrates an example of an airbag disposed within an armrest. Both of these designs form a weakened deployment seam within the plastic material forming the dashboard and armrest. The deployment seam is typically formed on both an inside and outside of the material. Once deficiency with forming the seam on both sides of the material is that this creates a noticeable cut or depression in the dashboard and armrest. As disclosed in the European '872 patent, the seams are typically formed by inserting a welder into the material itself. This method of forming the seams can significantly reduce the operating life of the welder.

The frequent use of airbags has lead to the thought of installing airbags in other locations within the vehicle. One prominent direction is toward installing airbags directly within a vehicle seat. Primarily, the airbags are installed within a side bolster of the seat such that they provide better head, neck and side protection for the occupant. These airbags are commonly called side impact airbags. Side impact airbags operate much the same fashion as frontal airbags. A crash sensor is often located in a B-pillar of the vehicle which detects a serious impact occurring perpendicular to the side of the vehicle. As appreciated, there is little clearance between the passenger and the outside of the vehicle door. Hence, side impact airbags must inflate much faster than frontal airbags.

The side impact airbags are frequently concealed within the seat by a trim cover material. The trim cover material is typically made up of multiple smaller pieces of material which are sewn together. The airbags break through the sewn seams during deployment. One of the major concerns with seat integrated side impact airbags is achieving successful deployment of the airbag through the proper seam in the trim cover each and every time.

One frequent difficulty associated with side impact airbag deployment is that the airbag deploys through the seam at a wrong angle. This limits the amount of protection available to the passenger and may even injure the passenger. Another problem occurs when the airbag exits through the wrong seam such as through the front or the back of the seat. This may also cause additional injury and may not adequately protect the passenger. In addition, the airbag may not exit the seat at all. In this situation, the airbag balloons within the trim cover material and never breaks the seam.

The deployment problems occur for a number of reasons. The trim cover material typically has an elasticity which works against the braking force the airbag. In addition the trim cover material is secured to a foam pad by either thin wire rods, hog rings, a hook and loop fastener, or a bonding process. None of these manufacturing methods are strong enough to hold the trim cover material to the foam pad when the airbag is being deployed. The airbag will always follow the path of least resistance and may detach the trim cover from the foam pad such that the airbag will wander within the trim cover itself.

One solution contemplated by the prior art is to sew straps into the trim cover and tie the straps to the seat back frame to hold the trim cover material to the foam pad and seat back frame. This solution, however, has a number of deficiencies. Some of the deficiencies are that the straps may be difficult to secure to the frame, it would be difficult to ensure proper attachment and proper taughtness, and the straps may provide unpredictable deployment characteristics.

Accordingly, it is desirable to create a weakened deployment seam within the trim cover material that is the weakest point in the trim cover such that the airbag can predictably break through the trim cover material and fully deploy. The deployment seam must also be strong enough to maintain its integrity during normal use of the seat.

Some solutions have been contemplated by the prior art such as laser cutting and changing the parameters of the stitching. The laser cutting is unreliable in that the particular depth needed is difficult to uniformly achieve. The laser cutting is also time consuming and expensive. Changing the parameters of the stitching along the area of deployment is also difficult to control and expensive to implement.

Ultrasonic welding is a means of fusing pieces of material together and for forming cuts or grooves within both sides of a material. One such example of ultrasonic welding is shown in French Patent No. 2 665 683 which ultrasonically welds thin plastic bags. The known ultrasonic welders, however, have not been modified and thus are not capable of forming seams within relatively thick multilayered pieces of material such as trim cover materials.

SUMMARY OF THE INVENTION

An automotive seat assembly is provided with an integrated airbag. The seat assembly comprises a seat cushion and a seat back mounted to the seat cushion. A seat cushion trim cover material covers the seat cushion and a seat back trim cover material covers the seat back. The seat assembly is characterized by a tear seam integrally formed within at least one of the trim cover materials to define a frangible line of weakness within the trim material wherein the airbag will tear trough the tear seam when the airbag is deployed and inflated to a position outside of the seat assembly.

Accordingly, the subject invention provides a weakened tear seam within the trim cover material which is the weakest point in the trim cover such that the airbag can predictably and effectively break through the trim cover material and fully deploy. The tear seam is also strong enough to maintain its integrity during normal use of the seat assembly.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is a perspective view of the seat with the airbag partially deployed;

FIG. 4 is a perspective view of a welder for forming the tear seam within the trim cover material;

DETAILED DESCRIPTION OF THE PREFERRED EMBODIMENT

Figure 1:
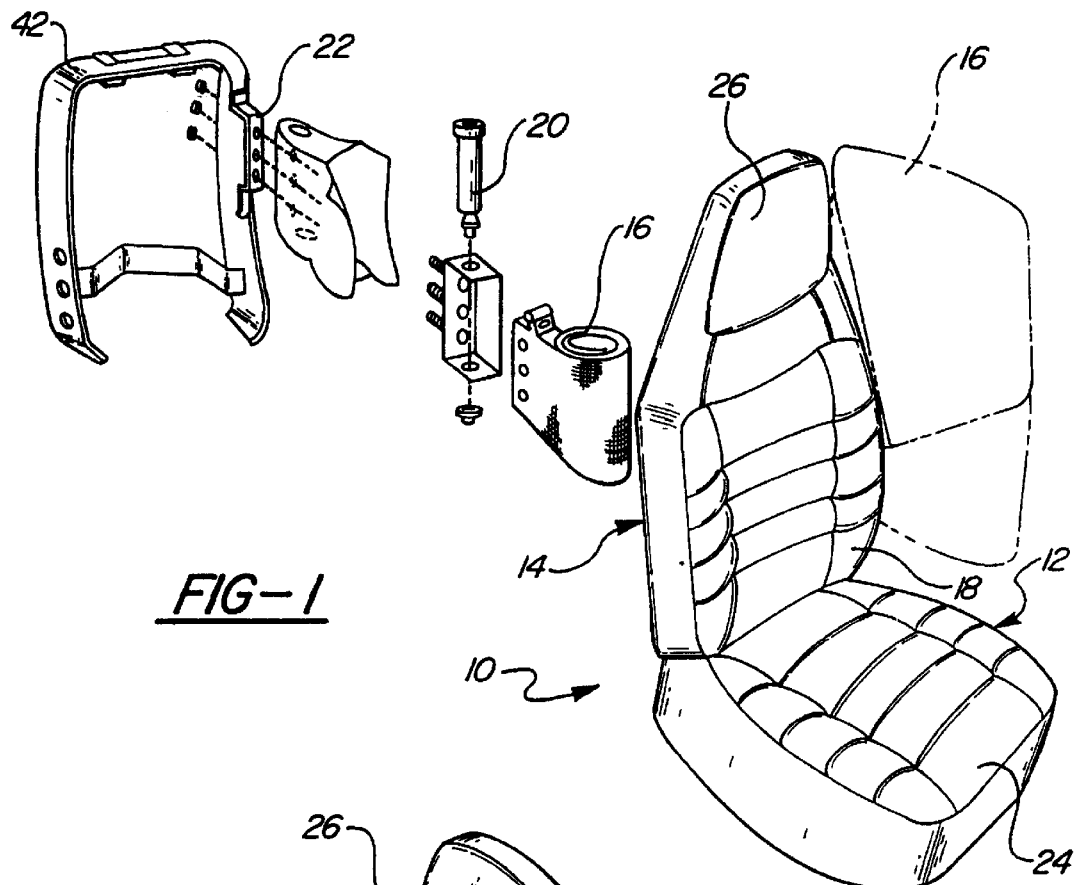
FIG. 1 an exploded perspective view of an automotive seat assembly incorporating an airbag.
Figure 2:
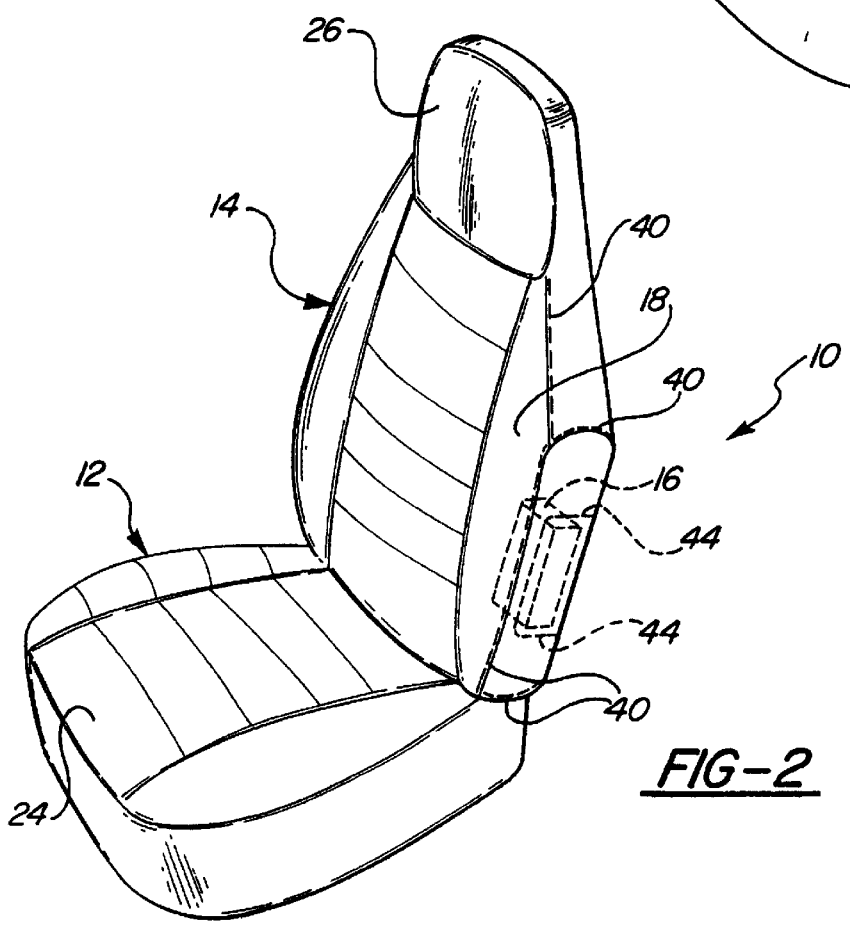
FIG. 2 is a perspective view of the seat indicating a tear seam and the airbag in phantom.

Referring to the Figures, wherein like numerals indicate like or corresponding parts throughout the several views, an automotive seat assembly is generally shown at 10 in FIGS. 1, 2 and 3. The seat assembly 10 comprises a seat cushion 12 and a seat back 14 mounted to the seat cushion 12. The seat assembly 10 has an integrated airbag 16. Preferably, the airbag 16 is a side impact type airbag mounted within a bolster section 18 of the seat back 14. As appreciated, the airbag 16 may be mounted within any suitable section of the seat back 14 and/or seat cushion 12.

As shown in FIG. 1, the side impact airbag 16 includes an inflator 20 which inflates the airbag 16 in response to a signal from a crash sensor (not shown). The crash sensor is typically mounted within a B-pillar of a vehicle (not shown). The airbag 16 is shown in a compacted condition and in a completely deployed condition in phantom. In addition, the airbag 16 is shown in a non-deployed position in phantom in FIG. 2 and a partially deployed position in FIG. 3. As appreciated, the airbag 16 is illustrated schematically in FIGS. 2 and 3. The inflator 20 and airbag 16 are mounted to a bracket 22 which is welded to the seat back 14. Preferably the airbag 16 has a 30 liter volume capacity which allows the airbag 16 to expand over a large area to protect the passenger. As appreciated, the side impact airbag 16 may be of any suitable size, design or configuration as is known in the art.

Figure 5:
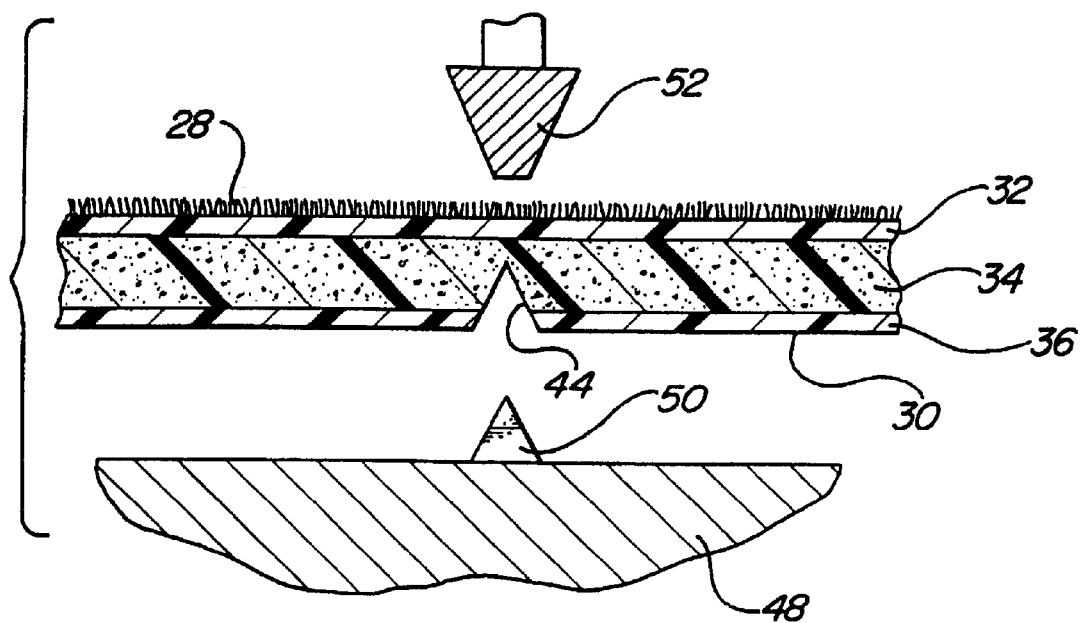
FIG. 5 is a cross-sectional view of the welder with the trim cover material disposed therebetween.
Figure 6:
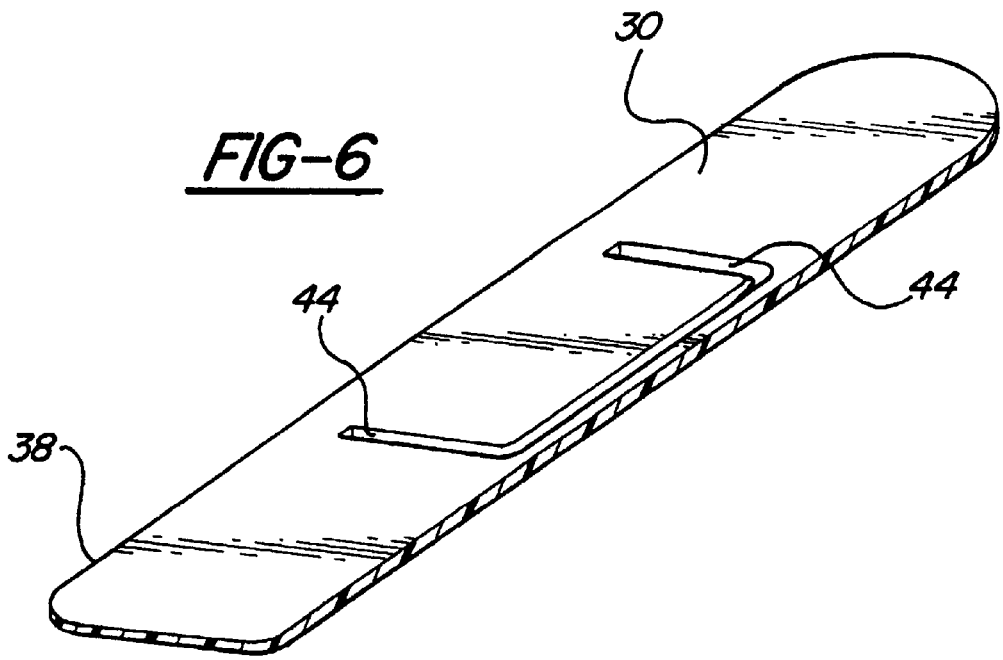
FIG. 6 is a perspective view of an inside surface of the trim cover material.

Side impact airbags 16 are frequently concealed within the seat by a trim cover material. Specifically, a seat cushion trim cover material 24 covers the seat cushion 12 and a seat back trim cover material 26 covers the seat back 14 as is known in the art. Referring also to FIG. 5, the seat back 26 and the seat cushion 24 trim cover materials each have an outside surface 28 and an inside surface 30. The outside surface 28 is also shown in FIG. 4 and the inside surface 30 is also shown in FIG. 6. Specifically, the trim cover materials 24, 26 comprise an outer seating layer 32 which defines the outside surface 28. The outer seating layer 32 may be of any suitable material such as fabric, vinyl, leather or a combination thereof. A thin foam sheet 34 and a backing material 36 are mounted to the outer seating layer 32 and define the inside surface 30. As appreciated, the trim cover materials 24, 26 may have a different structure without deviating from the scope of the subject invention. The trim cover materials 24, 26 comprise a plurality of smaller material pieces 38 which are sewn together to form a plurality of sewn seams 40. An illustrated example of a material piece 38 is shown in FIGS. 4 and 6. The size and shape of the smaller material pieces 38 are dependent upon the particular seating design. As appreciated, any size and shape of material pieces 38 may be part of the subject invention.

As illustrated in FIG. 1, the seat back 14 also includes a seat back frame 42 and the seat cushion 12 similarly includes a seat cushion frame (not shown). In the preferred embodiment, the seat back frame 42 supports the airbag 16 with the seat back trim cover material 26 covering the seat back frame 42 and the airbag 16.

As best shown in FIGS. 2, 3 and 6, the seat assembly 10 is characterized by a tear seam 44 integrally formed within at least one of the trim cover materials 24, 26 to define a frangible line of weakness within the trim cover material 24, 26 wherein the airbag 16 will tear through the tear seam 44 when the airbag 16 is deployed and inflated to a position outside of the seat assembly 10. Preferably, the tear seam 44 is a groove like indentation formed within the inside surface 30 of one of the trim cover materials 24,26. This creates a hidden seam such that the seat assembly 10 may maintain an aesthetically pleasing appearance. Marking on the outside surface 28 of the trim cover material 24, 26 may also be done if desired. The tear seam 44 and/or marking on the outside surface 28 could resemble some type of logo or design.

Even more preferably, the tear seam 44 is formed within the seat back trim cover material 26 such that the side impact airbag 16 may be easily deployed through the bolster 18. The tear seam 44 is formed within the seat back trim cover material 26 between at least a pair of the sewn seams 40. The frangible line of weakness defined by the tear seam 44 is weaker than the sewn seams 40 such that the tear seam 44 will tear before the sewn seams 40.

Referring also to FIG. 5, the tear seam 44 has a substantially V-shaped configuration when viewed in cross-section. Specifically, the V-shaped tear seam 44 is formed within the foam sheet 34 and the backing material 36. The V-shaped tear seam 44 is only illustrative of one embodiment and the tear seam 44 may have any suitable cross-section without deviating from the scope of the subject invention.

The tear seam 44 is integrally formed within the inside surface 30 of the seat back trim cover material 26 by a novel manufacturing method which is now discussed in detail. For illustrative purposes, only the seat back trim cover material 26 will be discussed. It is appreciated that seat cushion trim cover material 24 may also be utilized. The method of integrally forming the tear seam 44 within the seat trim cover material 26 uses a welder 46 and a template 48 having a raised ridge 50. The method comprising the steps of: placing the inside surface 30 of the trim cover material 26 over the template 48 such that the inside surface 30 of the trim cover material 26 contacts the raised ridge 50; moving the welder 46 adjacent the outside surface 28 of the trim cover material 26 such that the trim cover material 26 is wedged between the template 48 and the welder 46; aligning the welder 46 with the raised ridge 50 of the template 48; and heating the welder 46 to a predetermined temperature to integrally form the tear seam 44 within the inside surface 30 of the trim cover material 26.

The heating of the welder 46 is further defined by ultrasonically heating the trim cover material 26 to at least a partially molten state to integrally form the tear seam 44. The ultrasonic heating of the trim cover material 26 is created by vibratory energy which is converted to heat through friction. As discussed below, any type of ultrasonic welder may be used as is known in the art. The heat subsequently melts the desired portion of the trim cover material 26. When a molten state is reached, the vibration is stopped and pressure is the applied from the welder 46 onto the trim cover material 26. The pressure is maintained until the trim cover material 26 solidifies, thereby forming the tear seam 44 within the inside surface 30 of the trim cover material 26.

The manufacturing apparatus for performing the method of operation and creating the tear seam 44 is now discussed in detail with reference to FIGS. 4 through 8. The manufacturing apparatus comprises the template 48 for supporting the seat back trim cover material 26. As above, only the seat back trim cover material 26 will be subsequently discussed. The template 48 may be of any suitable size. Although not specifically shown, the template 48 is preferably the same size as the piece of trim cover material 26 being welded.

The raised ridge 50 extends upwardly from the template 48 for abutment with the inside surface 30 of the trim cover material 26. Hence, the trim cover material 26 is placed face down over the template 48. The welder 46 is disposed adjacent the outside surface 28 of the trim cover material 26 such that the trim cover material 26 is wedged between the template 48 and the welder 46. The welder 46 is aligned with the raised ridge 50 to form the tear seam 44 within the trim cover material 26.

The welder 46 is an ultrasonic welder which ultrasonically heats a portion of the trim cover material 26 to a predetermined temperature to integrally form the tear seam 44. The ultrasonic welder 46 includes a power supply (not shown) and a horn 52. A pneumatically activated carriage moves the horn 52 upward and downward and an electronic controller (not shown) controls the ultrasonic exposure and clamping time. The horn 52 is preferably an aluminum slotted tool which has a similar shape as the raised ridge 50. The electronic controller can vary the exposure time which can form deeper and/or wider tear seams. The depth and width of the tear seam 44 will depend upon the type of trim cover material 26 and the type of sewn seam 40 used in the seat assembly 10. Certain sewn seams 40 are stronger than others.

The trim cover material 26 is wedged between the horn 52 and the raised ridge 50 of the template 48. For illustrative purposes, the horn 52, trim cover material 26 and template 48 are shown in a spaced apart relationship in FIG. 4. As appreciated, the horn 52 will move downward until contacting the trim cover material 26. The horn 52 of the ultrasonic welder 46 is an acoustic tool that transfers the vibratory energy directly to the parts being welded. As discussed above, the vibratory energy is converted to heat through friction which melts the desired portion of the trim cover material 26. The portion of the trim cover material 26 which is heated is the portion which contacts the raised ridge 50. Specifically, the welder 46 heats the foam sheet 34 and the backing material 36 to form the tear seam 44.

The raised ridge 50 preferably has a substantially C-shaped configuration for creating a C-shaped tear seam 44. As appreciated, when the airbag 16 deploys and breaks through the C-shaped tear seam 44, a trim cover flap 54 will be created. This is desirable such that the trim cover material 26 does not completely detach from the seat assembly 10 and cause any injury. In other words, the preferred configuration of the tear seam 44 does not allow any portion of the trim cover material 26 to detach from the seat assembly 10.

Figure 7:
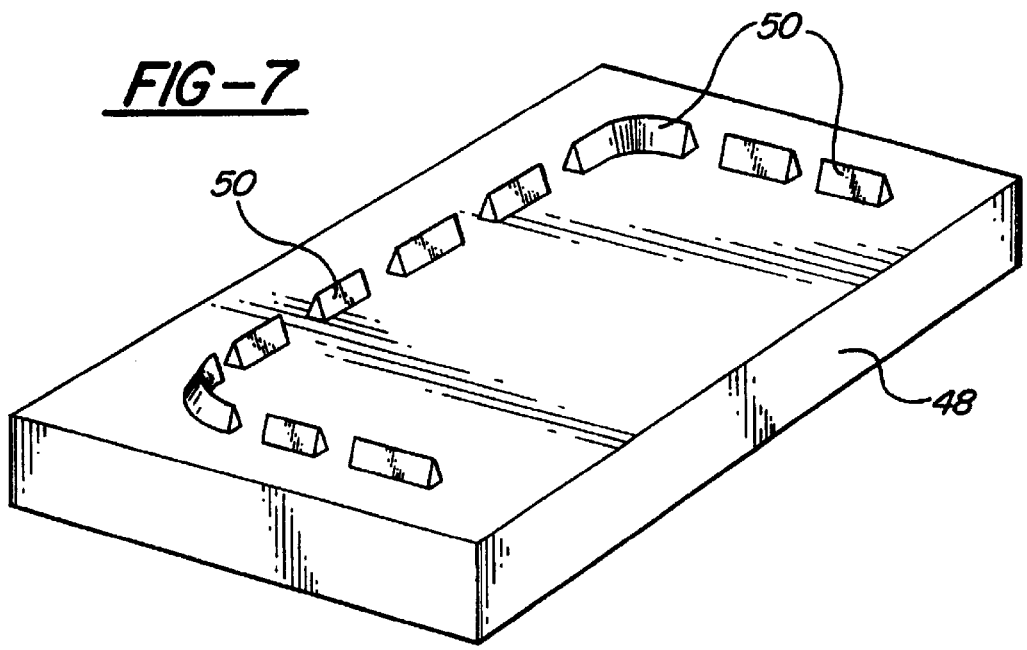
FIG. 7 is an alternative embodiment of a template.
Figure 8:
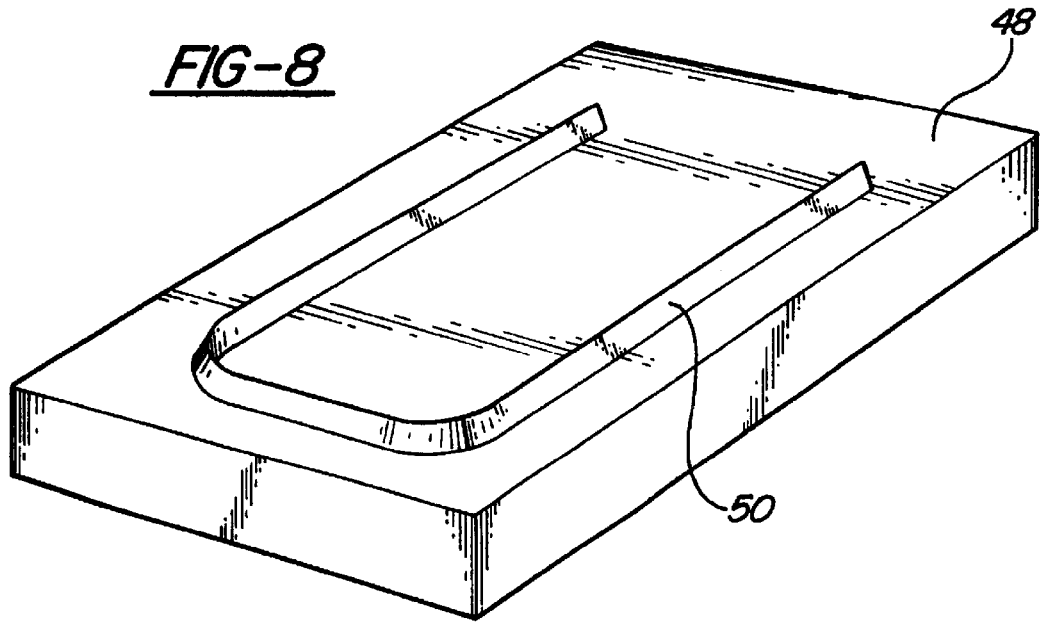
FIG. 8 is another alternative embodiment of the template.

The horn 52 preferably has a C-shaped configuration to correspond to the C-shaped raised ridge 50. The C-shaped edge may be a continuous edge as shown in FIG. 4 or a multiple of smaller sections as shown in FIG. 7. In addition, the raised ridge 50 and horn 52 may have a different shape such as a U-shaped configuration as shown in FIG. 8. As appreciated, the portion of the trim cover material 26 that melts and subsequently forms into the tear seam 44 will correspond to the desired shape of the raised ridge 50 and horn 52.

As shown in FIG. 5 and discussed above, the tear seam 44 has a substantially V-shaped configuration when viewed in cross-section. The raised ridge 50 has a substantially triangular shaped configuration when viewed in cross section for forming the V-shaped tear seam 44. As appreciated, the raised ridge 50 may have any suitable cross-sectional configuration which will create any suitably shaped tear seam 44.

Many modifications and variations of the present invention are possible in light of the above teachings. It is, therefore, to be understood that within the scope of the appended claims the invention may be practiced otherwise than as specifically described.

What is claimed is:

1. A method of integrally forming tear seam (44) within a multilayered seat cover material (24, 26) having at least one outer layer (32) and at least one inner layer (34, 36) by using an ultrasonic welder (46) and a template (48) having a raised ridge (50), said method comprising the steps of;

placing the cover material (24, 26) over the template (48) within an inside surface (30) of the inner layer (34, 36) in contact with the raised ridge (50);

moving the ultrasonic welder (46) adjacent an outside surface (28) of the outer layer (32) in alignment with the raised ridge (50) of the template (48) and wedging the trim cover material (24, 26) between the ultrasonic welder (46) and the raised ridge (50); and ultrasonically heating the layer (34, 36) with the ultrasonic welder (46) to form a tear seam (44) having at least one of the inner layers (34, 36).

2. A method as set forth in claim 1 wherein the ultrasonically heating of the trim cover material (24, 26 is further defined as heating the inner layers (34, 36) to at least a partially molten state.

3. A method as set forth in claim 2 wherein the ultrasonic welder (46) wedges the trim cover (24, 26) onto the raised ridge (50) until the trim cover material (24, 26) solidifies.

4. A method as set forth in claim 3 wherein the forming of the tear seam (44) is further defined by forming a substantially V-shaped tear seam (44).

5. A method as set forth in claim 4 wherein the forming of the tear seam (44) is further defined by providing a substantially triangular shaped ridge (50) for forming the V-shaped tear seam (44).

* * * * *

UNITED STATES PATENT AND TRADEMARK OFFICE
CERTIFICATE OF CORRECTION

PATENT NO. : 6,523,237 B1 Page 1 of 1
DATED : February 25, 2003
INVENTOR(S) : Kopec et al.

It is certified that error appears in the above-identified patent and that said Letters Patent is hereby corrected as shown below:

<u>Column 1,</u>
Line 16, delete "researches" and insert -- researchers -- therefor.
Line 17, delete "can" and insert -- cars -- therefor.
Line 26, delete "Once" and insert -- One -- therefor.
Line 34, delete "lead" and insert -- led -- therefor.
Line 41, insert -- in -- between "operate" and "much".

<u>Column 2,</u>
Line 1, insert -- of -- between "force" and "the".
Line 49, insert -- cover -- between "trim" and "material".
Line 50, delete "trough" and insert -- through -- therefor.

<u>Column 3,</u>
Line 6, delete "the" and insert -- a -- therefor.

<u>Column 4,</u>
Line 43, delete "comprising" and insert -- comprises -- therefor.

<u>Column 6,</u>
Line 25, insert -- a -- between "forming" and "tear".
Lines 26 and 30, insert -- trim -- between "seat" and "cover".
Line 38, insert -- inner -- between "the" and "layer".
Line 39, delete "a" and insert -- the -- therefor.
Line 42, insert -- ) -- between "26" and "is".
Line 46, insert -- material -- after "cover" and before "(24, 26)".

Signed and Sealed this

Twenty-second Day of April, 2003

JAMES E. ROGAN
*Director of the United States Patent and Trademark Office*